United States Patent
Lin et al.

(10) Patent No.: US 9,489,085 B2
(45) Date of Patent: Nov. 8, 2016

(54) OPTICAL TOUCH PANEL SYSTEM AND POSITIONING METHOD THEREOF

(71) Applicants: Chun-Shen Lin, Hsin-Chu (TW);
Chun-Yi Lu, Hsin-Chu (TW);
Chi-Chieh Liao, Hsin-Chu (TW);
Tzung-Min Su, Hsin-Chu (TW);
Ming-Tsan Kao, Hsin-Chu (TW)

(72) Inventors: Chun-Shen Lin, Hsin-Chu (TW);
Chun-Yi Lu, Hsin-Chu (TW);
Chi-Chieh Liao, Hsin-Chu (TW);
Tzung-Min Su, Hsin-Chu (TW);
Ming-Tsan Kao, Hsin-Chu (TW)

(73) Assignee: PIXART IMAGING INCORPORATION, R.O.C., Hsin-Chu (TW)

(*) Notice: Subject to any disclaimer, the term of this patent is extended or adjusted under 35 U.S.C. 154(b) by 220 days.

(21) Appl. No.: 13/647,289

(22) Filed: Oct. 8, 2012

(65) Prior Publication Data

US 2014/0098062 A1 Apr. 10, 2014

(51) Int. Cl.
*G06F 3/042* (2006.01)
*G06F 3/041* (2006.01)
*G06F 3/038* (2013.01)

(52) U.S. Cl.
CPC .............. *G06F 3/042* (2013.01); *G06F 3/0414* (2013.01); *G06F 3/0421* (2013.01); *G06F 3/0428* (2013.01); *G06F 3/0386* (2013.01)

(58) Field of Classification Search
CPC ..... G06F 3/042; G06F 3/0414; G06F 3/0386
USPC .................................. 345/175, 173
See application file for complete search history.

(56) References Cited

U.S. PATENT DOCUMENTS

| | | | |
|---|---|---|---|
| 4,782,328 A | 11/1988 | Denlinger | |
| 7,689,381 B2 | 3/2010 | Lin et al. | |
| 8,692,768 B2* | 4/2014 | Chtchetinine | G06F 3/0325 345/157 |
| 2010/0010773 A1 | 1/2010 | Lin et al. | |
| 2010/0309169 A1* | 12/2010 | Lieberman et al. | 345/175 |
| 2011/0006981 A1* | 1/2011 | Chtchetinine et al. | 345/157 |
| 2011/0242056 A1* | 10/2011 | Lee et al. | 345/175 |
| 2012/0176345 A1* | 7/2012 | Ye et al. | 345/175 |
| 2012/0218225 A1* | 8/2012 | Lo et al. | 345/175 |
| 2013/0135259 A1* | 5/2013 | King et al. | 345/175 |

FOREIGN PATENT DOCUMENTS

| | | | | |
|---|---|---|---|---|
| CN | WO2011038682 A1 * | 4/2011 | | G06F 3/041 |
| TW | 201003477 | 1/2010 | | |
| TW | M398155 | 2/2011 | | |
| TW | 098131423 | 4/2011 | | |

* cited by examiner

*Primary Examiner* — Chanh Nguyen
*Assistant Examiner* — Yuzhen Shen
(74) *Attorney, Agent, or Firm* — Tung & Associates (57) ABSTRACT

The present invention discloses an optical touch panel system and a positioning method for positioning an object existing in a touch control area. The system includes: at least one reflective element disposed on a side of the touch control area; at least one light guide module disposed on a side of the touch control area adjacent to or opposite the reflective element and emitting light; an image sensor capturing an image of the object; a plurality of photo detectors arranged on a side of the touch control area adjacent to the image sensor and sensing the object to obtain shade information; and a processor calculating the coordinates of the object according to the image and the shade information.

20 Claims, 5 Drawing Sheets

OPTICAL TOUCH PANEL SYSTEM AND POSITIONING METHOD THEREOF

CROSS REFERENCE

The present invention claims priority to TW 100138762, filed on Oct. 26, 2011.

BACKGROUND OF THE INVENTION

1. Field of Invention

The present invention relates to an optical touch panel system and a positioning method thereof, in particular to such optical touch panel system and positioning method which utilize plural photo detectors to resolve the problem of blind zones.

2. Description of Related Art

Touch screen apparatuses are a kind of interactive apparatuses for users to directly and intuitively operate application software on screen. There are various types of touch screen apparatuses, and one of which is the optical touch panel.

Figure 1:
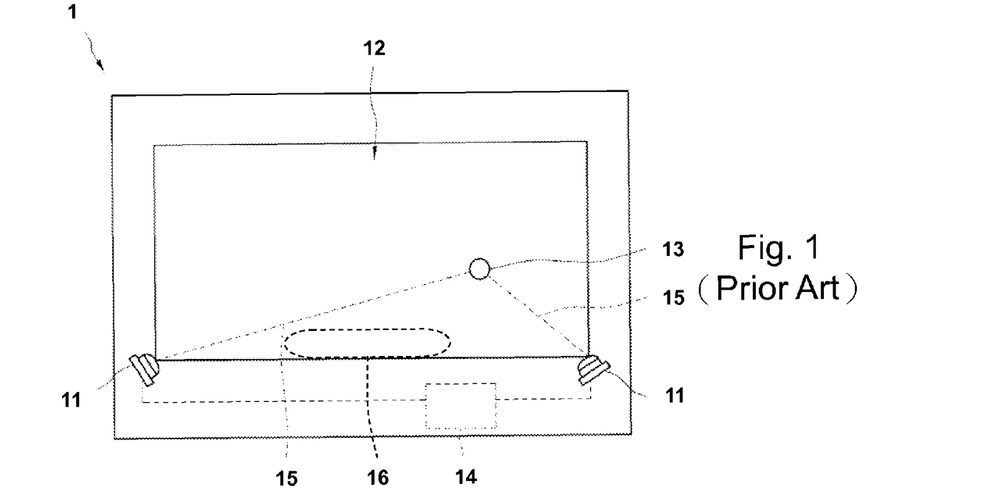
FIG. 1 shows a prior art optical touch panel system.

FIG. 1 shows a prior art optical touch panel system 1 which is disclosed by U.S. Pat. No. 4,782,328. As shown in FIG. 1, the optical touch panel system 1 comprises two sensors 11 for capturing the images of an object 13 on a touch control area 12. A processor 14 is coupled to the two sensors 11, and calculates the sensing paths 15 linking the object 13 with the two sensors 11 by analyzing the images outputted by the sensors 11. The processor 14 also calculates the coordinates of the position of the object 13 according to the sensing paths 15. When the object 13 is in the region 16 of the touch control area 12 close to the side where the two image sensors 11 are, because the object 13 is located near the outer of the view angle of the two image sensors 11, the images of the object 13 formed in the two image sensors 11 are deteriorated or illegible. The region 16 is called a blind zone.

Figure 2:
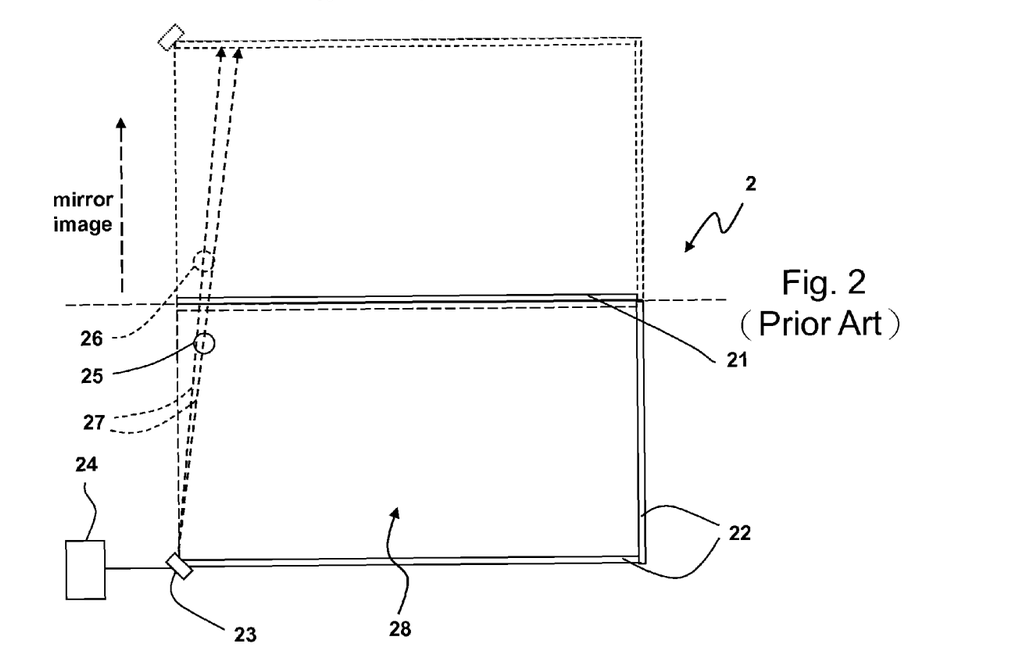
FIG. 2 shows another prior art optical touch panel system.

FIG. 2 shows another prior art optical touch panel system 2 disclosed by Taiwanese Patent Publication No. 201003477, counterpart U.S. Pat. No. 7,689,381 B2. The optical touch panel system 2 comprises a mirror 21, two light sources 22, an image sensor 23 and a processor 24. The mirror 21 and the two light sources 22 are located around a touch control area 28. The mirror 21 is used to reflect the object 25 to generate a mirror image 26 of the object 25. The image sensor 23 captures the image of the object 25 and the mirror image 26. The processor 24 analyzes the sensing paths 27 passing the image of the object 25 and the mirror image 26, and calculates the coordinates of the object 25 according to the two sensing paths 27.

In the optical touch panel system 2, when the two sensing paths 27 are too close to each other, the images of the object 25 and the mirror image 26 overlap with each other, and the position of the object 25 cannot be obtained. As shown in FIG. 2, when the object 25 is in the region of the touch control area 28 near the side where no light source is provided, the precise position of the object 25 cannot be detected because the images of the object 25 and the mirror image will overlap. This region is called the blind zone.

Figure 3:
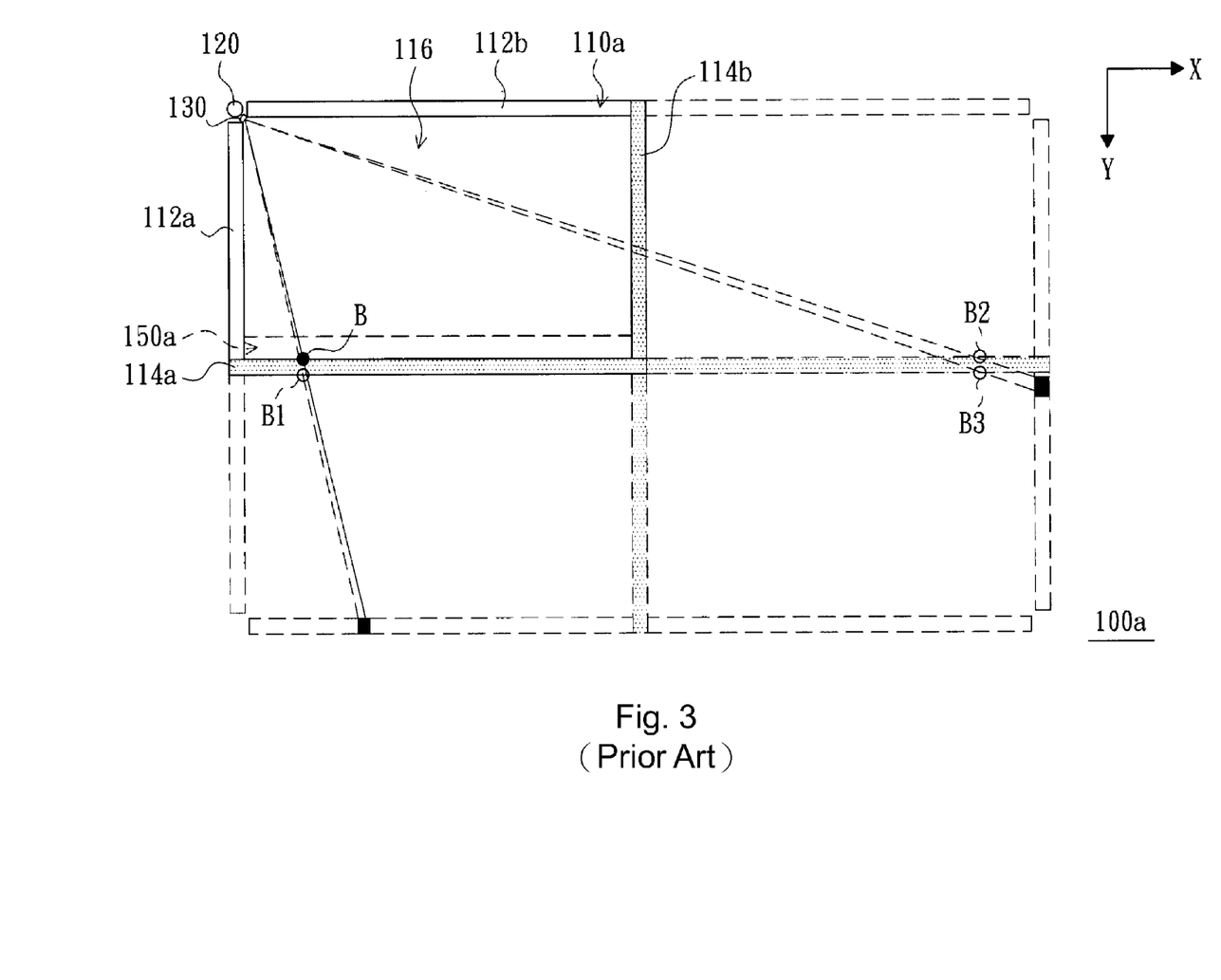
FIG. 3 shows another prior art optical touch panel system.

To resolve the problem of the blind zone, Taiwanese Invention Patent Application No. 098131423 (FIG. 10 of U.S. Patent Publication No. 2010/0309169 also discloses a similar apparatus) provides an optical touch control apparatus, as shown in FIG. 3. The optical touch control apparatus 100a comprises a lighting device 120, an image detection module 130, two light guide bars (112a, 112b), and two stripe-like mirrors (114a, 114b). The light guide bars (112a, 112b) are close to each other, and the stripe-like mirrors (114a, 114b) are close to each other. The light guide bars (112a, 112b) and the stripe-like mirrors (114a, 114b) are disposed around the four sides of a rectangle. The inside area of the rectangle is a sensing area 116. The light guide module 110a includes two stripe-like mirrors (114a, 114b), so each point being touched in the sensing area 116 generates three mirror images. The image detection module 130 captures the real image of the object B and the mirror images B1-B3, and calculates the position of the object B according to these images. The area of the blind zone 150a in the optical touch control apparatus 100a is reduced, but the problem of the blind zone still exists. That is, the dark images of B and B1 partially overlap with each other and the dark images of B2 and B3 partially overlap with each other.

In view of above, the present invention overcomes the foregoing drawbacks by providing an optical touch panel system and a positioning method which utilize plural photo detectors to resolve the problem of blind zones, whereby the positioning of an object is more accurate.

SUMMARY OF THE INVENTION

An objective of the present invention is to provide an optical touch panel system for resolving the problem of blind zones.

Another objective of the present invention is to provide a positioning method of an optical touch panel system.

To achieve the foregoing objectives, in one aspect, the present invention provides an optical touch panel system for positioning an object existing in a touch control area, comprising: at least one reflective element disposed on a first side of the touch control area; at least one light guide module disposed on a second side of the touch control area adjacent to the reflective element or on a third side of the touch control area opposite the reflective element, the light guide module emitting light; an image sensor for capturing an image of the object; a plurality of first photo-detectors arranged on a fourth side of the touch control area adjacent to the image sensor, the first photo-detectors sensing the object to obtain first shade information; and a processor for calculating the coordinates of the object according to the image of the object and the first shade information.

In one embodiment, the image sensor is disposed on one end of the third side of the touch control area opposite the first side on which the reflective element is.

In one embodiment, the optical touch panel system further comprises a plurality of light emitting units disposed on a segment of the second side of the touch control area opposite the first photo detectors.

In one embodiment, the light guide module includes a light guide bar and at least one light emitting device disposed at an end of the light guide bar.

In one embodiment, the optical touch panel system comprises two light guide modules respectively disposed on the second and third sides of the touch control area adjacent to and opposite the reflective element.

In one embodiment, the optical touch panel system further comprises a plurality of second photo detectors disposed on the first side of the touch control area on which the reflective element is, wherein the second photo detectors are adjacent to the first photo detectors, and the second photo detectors sense the object to obtain second shade information for the processor to calculate the coordinates of the object.

In one embodiment, the optical touch panel system further comprises a plurality of second photo detectors disposed on the third side of the touch control area opposite the reflective element, wherein the second photo detectors are adjacent to the image sensor, and the second photo detectors sense the object to obtain second shade information for the processor to calculate the coordinates of the object.

In one embodiment, the first photo-detectors are photo diodes or photo transistors.

In one embodiment, the reflective element is a retro-reflector.

In one embodiment, the image sensor and the first photo-detectors alternatively receive light during different periods.

In yet another aspect, the present invention provides an optical touch panel system for positioning an object existing in a touch control area, comprising: two image sensors disposed on two ends of a side of the touch control area, the image sensors capturing images of the object; a plurality of photo detectors arranged on a middle segment of the side of the optical touch area on which the two image sensors are, the photo detectors sensing the object to obtain shade information; and a processor calculating the coordinates of the object according to the images and the shade information.

In one embodiment, the optical touch panel system further comprises at least one reflective element disposed on a side of the touch control area different from the side on which the two image sensors are.

In one embodiment, the optical touch panel system further comprises a light guide module disposed on a side of the touch control area different from the side of the touch control area on which the two image sensors are.

In another aspect, the present invention provides a positioning method of an optical touch panel system, comprising: capturing at least one image of an object existing in a touch control area by at least one image sensor; sensing the object to obtain first shade information by a plurality of first photo detectors; and calculating the coordinates of the object according to the at least one image and the first shade information.

The objectives, technical details, features, and effects of the present invention will be better understood with regard to the detailed description of the embodiments below, with reference to the drawings.

DESCRIPTION OF THE PREFERRED EMBODIMENTS

Figure 4:
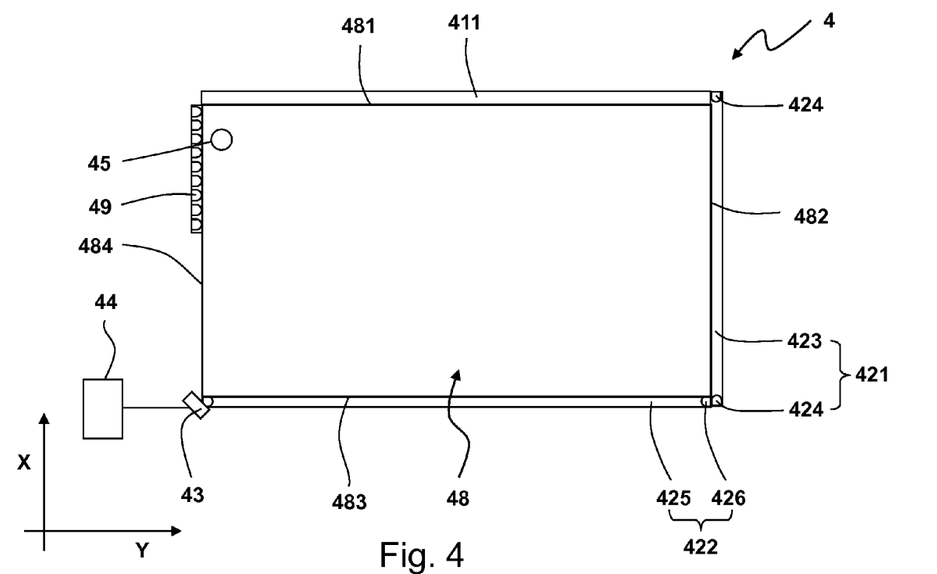
FIG. 4 shows a schematic diagram illustrating an embodiment of an optical touch panel system of the present invention.

FIG. 4 shows a schematic diagram illustrating an embodiment of an optical touch panel system of the present invention. When an object 45 (e.g. a finger or a stylus pen) is on or above the touch control areas 48 of an optical touch panel system 4, the system can calculate the coordinates of the object 45 to position it. The optical touch panel system 4 comprises a reflective element 411, a first light guide module 421, a second light module 422, an image sensor 43, a plurality of photo detectors 49, and a processor 44. The reflective element 411 is disposed on a first side 481 of the touch control area 48. The first and second light guide modules (421, 422) are respectively disposed on a second side 482 and a third side 483 of the touch control area 48 adjacent to each other. The first light guide module 421 may be, but not limited to, an assembly of alight guide bar 423 and at least one light emitting device 424, and similarly, the second light guide module 422 may be an assembly of a light guide bar 425 and at least one light emitting device 426. In this embodiment, two light emitting devices 424 are disposed at two opposite ends of the light guide bar 423, while only one light emitting device 426 is disposed at one end of the light guide bar 425. The light guide bar 423 directs the light emitted from the light emitting devices 424 towards the surface of the touch control area 48 and the light guide bar 425 directs the light emitted from the light emitting device 426 towards the surface of the touch control area 48. The light emitting devices 424 and 426 may each be, but not limited to, a linear light source capable of emitting invisible light. In a preferred embodiment, the image sensor 43 includes an image-sensing window and a filter.

As shown in this figure, the photo detectors 49 on the fourth side 484 can receive the light from the first light guide module 421 on the opposite side 482. However, when the object 45 is in the blind zone of the touch control area 48, a portion of the light is shaded by the object 45, so at least one photo detector 49 cannot receive sufficient light, although the other photo detectors 49 may receive light. Thus, the position of the object can be clearly defined by the shade information from the photo detectors 49. The photo detectors may be photo diodes, photo transistors, or other opto-electronic semiconductor devices capable of acting as a light-controllable switch.

The first light guide module 421 and the second light guide module 422 can be replaced by any other type of light emitting devices, provided that they can generate light to illuminate the object 45 in the touch control area 48, and the image sensor 43 and the photo detectors 49 can receive the light. To obtain the shade information with a better quality by the photo detectors 49, preferably but not necessary, the first light guide module 421 and the second light guide module 422 can be turned on in a two-step manner. That is, in the first period, the first light guide module 421 and the second light guide module 422 simultaneously emit light, and the image sensor 43 captures the image in this period. In the second period, only the first light guide module 421 emits light and the second light guide module 422 is turned off, and the photo detectors 49 sense the object 45 in this period so that the photo detectors 49 only receive light from their front side but not their lateral side. However, the two-step or multiple-step illumination is not necessary if the photo detectors 49 can sense the shade information with enough good quality when the first light guide module 421 and the second light guide module 422 both emit light. In the second period when the photo detectors 49 are active, to reduce excessive light for better quality lest the excessive light interfere the sensing of the photo detectors 49, it can be arranged so that only the light source facing the photo detectors 49 is turned on. For example, in one embodiment, only the upper one of the light emitting devices 424 of the first light guide module 421 is turned on. Thus, the interference from unnecessary light sources can be avoided, and electrical power is also saved.

The processor 44 analyzes the shade information obtained by the photo detectors 49 and the image obtained by the image sensor 43, to obtain the coordinates of the position of the object 45.

Figure 5:
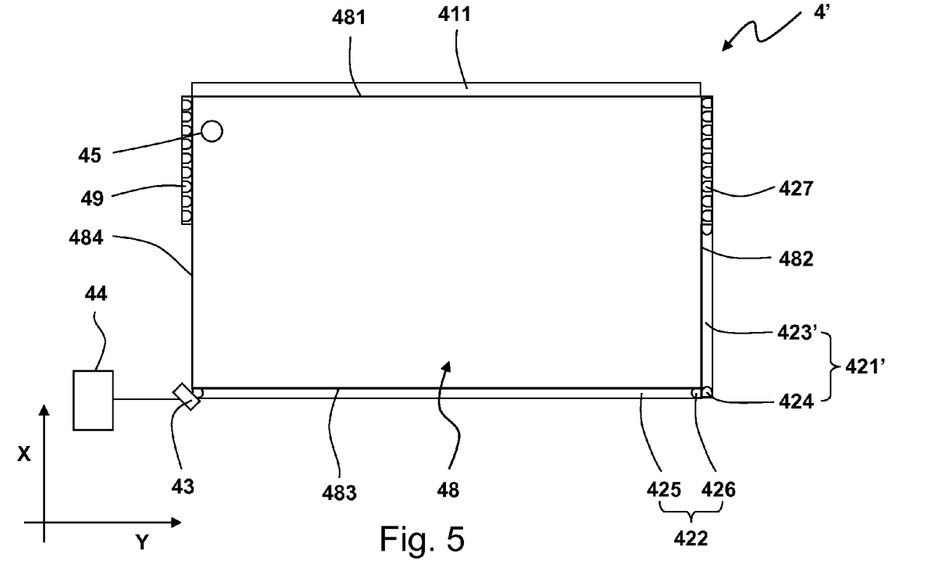
FIG. 5 shows a schematic diagram illustrating another embodiment of an optical touch panel system of the present invention.

FIG. 5 shows a schematic diagram illustrating another embodiment of an optical touch panel system of the present invention. Plural light emitting units 427 such as LEDs (light emitting diodes) are disposed on the second side 482 of the optical touch panel system 4'. Each of the light emitting units 427 on the second side 482 and a corresponding one of the photo detectors 49 on the fourth side 484 act as a pair of light emitter and light receiver, so that the shade information is further improved. The first light guide module 421' is adjacent to the light emitting units 427. The first light guide module 421' can include one light emitting device 424 at one end of the light guide bar 423' or two light emitting devices 424 disposed at two opposite ends of the light guide bar 423'.

Figure 6:
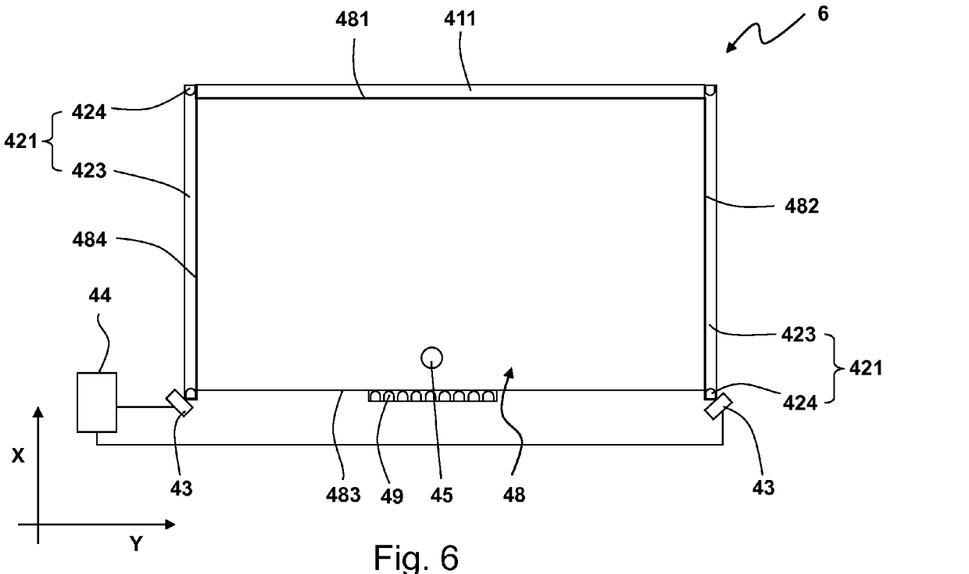
FIG. 6 shows a schematic diagram illustrating another embodiment of an optical touch panel system of the present invention.

FIG. 6 shows a schematic diagram illustrating another embodiment of an optical touch panel system of the present invention. Different from FIG. 4, the optical touch panel system 6 of this embodiment comprises two image sensors 43. Because a blind zone is located on the middle region close to the side (third side 483) on which the two image sensors 43 are, the photo detectors 49 are preferably disposed on the middle segment of the third side 483. Two first light guide modules 421 are respectively disposed on the second side 482 and the fourth side 484 opposite each other, and the first reflective element 411 is disposed on the first side 481. The above arrangement is just an example; the light guide modules and the reflective element may be respectively disposed on the first side 481, the second side 482, and the fourth side 484 in any arrangement. The processor 44 can calculate the coordinates of the position of the object 45 according to the images (including real images of the object 45 and virtual images from the reflective element) captured by the two image sensors 43 and the shade information obtained by the photo detectors 49.

Figure 7:
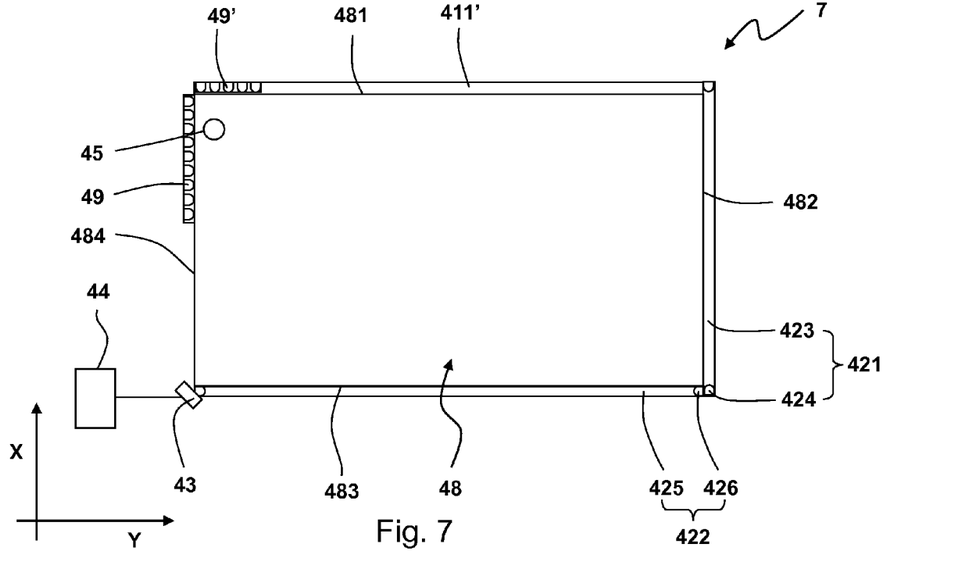
FIG. 7 shows a schematic diagram illustrating another embodiment of an optical touch panel system of the present invention.

FIG. 7 shows a schematic diagram illustrating another embodiment of an optical touch panel system of the present invention. Different from FIG. 4, the optical touch panel system 7 of this embodiment further comprises a plurality of photo detectors 49' disposed on the first side 481. The first reflective element 411' is adjacent to the photo detectors 49'. Furthermore, to obtain the shade information with a better quality by the photo detectors 49 and 49', preferably but not necessary, the first light guide module 421 and the second light guide module 422 can be turned on in a three-step manner. That is, in the first period, the first light guide module 421 and the second light guide module 422 simultaneously emit light, and the image sensor 43 captures the image in this period. In the second period, the first light guide module 421 emits light and the second light guide module 422 is turned off, and the photo detectors 49 sense the object 45 in this period, so that the photo detectors 49 only receive the light from their front side but not their lateral side. In the third period, the second light guide module 422 emits light and the first light guide module 421 is turned off, and the photo detectors 49' sense the object 45, so that the photo detectors 49' only receive the light from their front side but not their lateral side.

Figure 8:
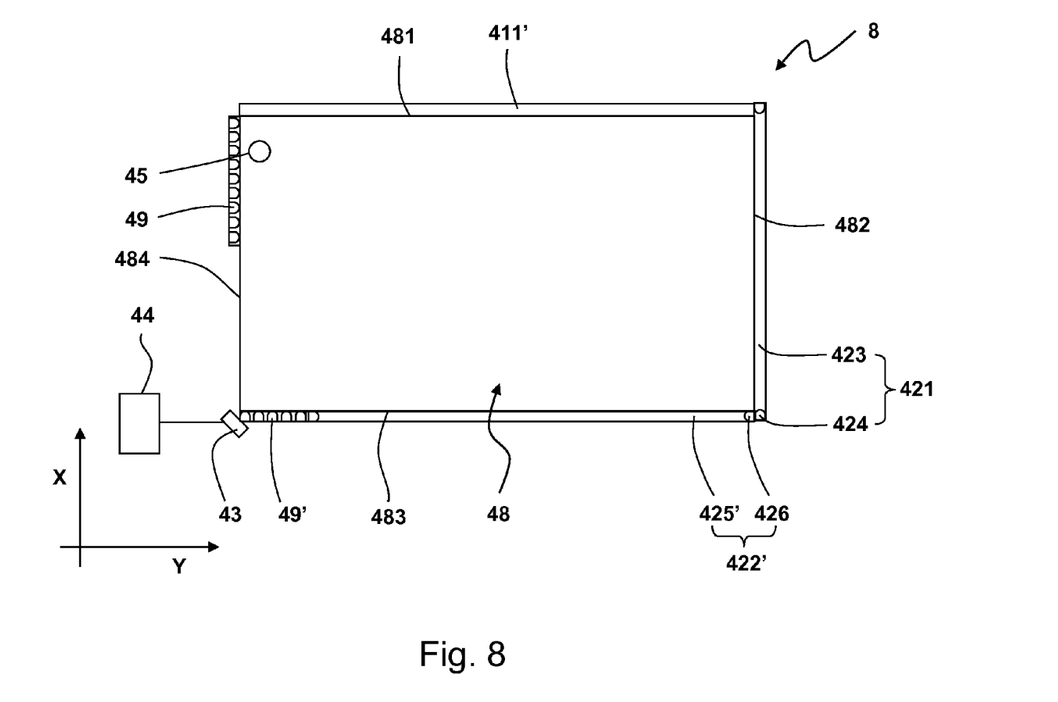
FIG. 8 shows a schematic diagram illustrating another embodiment of an optical touch panel system of the present invention.

FIG. 8 shows a schematic diagram illustrating another embodiment of an optical touch panel system of the present invention. In this embodiment, the photo detectors 49' are disposed on the third side 483. The light guide bar 425' of the second light guide module 422' is adjacent to the photo detectors 49'. Similar to the previous embodiment, preferably but not necessary, the first light guide module 421 and the second light guide module 422' can illuminate the touch control area in a three-step manner.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the positions and the number of the photo detectors can be different from the foregoing embodiments. For another example, the reflective element may be a retro-reflector, and three reflective elements can be respectively disposed on the three sides (481, 482, 484) opposite and adjacent the two image sensors 43 in the embodiment of FIG. 6. Thus, the present invention should cover all such and other modifications and variations, which should be interpreted to fall within the scope of the following claims and their equivalents.

What is claimed is:

1. An optical touch panel system for positioning an object existing in a touch control area including a first side, a second side adjacent to a first end of the first side, a third side opposite the first side, and a fourth side adjacent to a first end of the first side, the optical touch panel system comprising:
   at least one reflective element disposed on the first side of the touch control area;
   at least two light guide modules respectively disposed on the second and third sides of the touch control area adjacent to and opposite the reflective element, the light guide modules emitting light;
   an image sensor for capturing an image of the object;
   a plurality of first photo-detectors arranged on the fourth side of the touch control area adjacent to the image sensor, the first photo-detectors sensing the object to obtain first shade information;
   a plurality of second photo detectors for sensing the object to obtain second shade information, wherein the second photo detectors are
   (1) disposed non-symmetrically along the first side of the touch control area on which the reflective element is, and the second photo detectors are adjacent to the first photo detectors and farther from the second side; or
   (2) disposed non-symmetrically along the third side of the touch control area opposite the reflective element, and the second photo detectors are adjacent to the image sensor and farther from the second side; and
   a processor for calculating the coordinates of the object according to the image of the object and the first and second shade information,
   wherein:
   in a first period, the two light guide modules simultaneously emit light, and the image sensor captures the image in this first period;
   in a second period, the light guide module on the second side emits light and the light guide module on the third side is turned off, whereby when the first photo-detectors sense the object in this second period, the first photo-detectors receive light from a front side of the first photo-detectors but not a lateral side of first photo-detectors; and
   in a third period, the light guide module on the third side emits light and the light guide module on the second side is turned off, whereby when the second photo detectors sense the object in this third period, the second photo detectors only receive the light from their front side but not their lateral side.

2. The optical touch panel system of claim 1, wherein the image sensor is disposed on one end of the third side of the touch control area opposite the first side on which the reflective element is.

3. The optical touch panel system of claim 1, further comprising a plurality of light emitting units disposed on a segment of the second side of the touch control area opposite the first photo detectors.

4. The optical touch panel system of claim 1, wherein each of the light guide modules includes a light guide bar and at least one light emitting device disposed at an end of the light guide bar.

5. The optical touch panel system of claim 1, wherein the first photo detectors are photo diodes or photo transistors.

6. The optical touch panel system of claim 1, wherein the reflective element is a retro-reflector.

7. The optical touch panel system of claim 1, wherein the image sensor and the first photo detectors alternatively receive light during different periods.

8. An optical touch panel system for positioning an object existing in a touch control area, comprising:
   at least one reflective element disposed on a first side of the touch control area;
   at least two light guide modules respectively disposed on a second side of the touch control area adjacent to the reflective element and on a third side of the touch control area opposite the reflective element, the light guide modules emitting light;
   an image sensor for capturing an image of the object according to the light emitted from at least one of the light guide modules;
   a plurality of first photo-detectors arranged on a fourth side of the touch control area adjacent to the image sensor, the first photo-detectors sensing the object according to the light emitted from at least one of the light guide modules to obtain first shade information;
   a plurality of second photo detectors disposed non-symmetrically on the first side or the third side, closer to the fourth side and farther from the second side, wherein the second photo detectors are adjacent to the first photo detectors and extend from the fourth side toward the second side to occupy only a portion of the first side or the third side, and the second photo detectors sense the object to obtain second shade information for the processor to calculate the coordinates of the object; and
   a processor for calculating the coordinates of the object according to the image of the object and the first shade information,
   wherein:
   in a first period, the two light guide modules simultaneously emit light, and the image sensor captures the image in this first period;
   in a second period, the light guide module on the second side emits light and the light guide module on the third side is turned off, whereby when the first photo-detectors sense the object in this second period, the first photo-detectors receive light from a front side of the first photo-detectors but not a lateral side of first photo-detectors; and
   in a third period, the light guide module on the third side emits light and the light guide module on the second side is turned off, whereby when the second photo detectors sense the object in this third period, the second photo detectors only receive the light from their front side but not their lateral side.

9. The optical touch panel system of claim 8, wherein the image sensor is disposed on one end of the third side of the touch control area opposite the first side on which the reflective element is.

10. The optical touch panel system of claim 8, further comprising a plurality of light emitting units disposed on a segment of the second side of the touch control area opposite the first photo detectors.

11. The optical touch panel system of claim 8, wherein each of the light guide modules includes a light guide bar and at least one light emitting device disposed at an end of the light guide bar.

12. The optical touch panel system of claim 8, wherein the first photo detectors are photo diodes or photo transistors.

13. The optical touch panel system of claim 8, wherein the reflective element is a retro-reflector.

14. An optical touch panel system for positioning an object existing in a touch control area comprising:
   at least one reflective element disposed on a first side of the touch control area;
   at least two light guide modules respectively disposed on a second side of the touch control area adjacent to the reflective element and on a third side of the touch control area opposite the reflective element, the light guide modules emitting light;
   an image sensor for capturing an image of the object;
   a plurality of first photo-detectors arranged on a fourth side of the touch control area adjacent to the image sensor, the first photo-detectors sensing the object to obtain first shade information;
   a plurality of second photo detectors for sensing the object to obtain second shade information, wherein the second photo detectors are
      (1) disposed non-symmetrically along the first side of the touch control area on which the reflective element is, and the second photo detectors are closer to the fourth side and farther from the second side; or
      (2) disposed non-symmetrically along the third side of the touch control area opposite the reflective element, and the second photo detectors are closer to the fourth side and farther from the second side; and
   a processor for calculating the coordinates of the object according to the image of the object and the first and second shade information,
   wherein:
   in a first period, the two light guide modules simultaneously emit light, and the image sensor captures the image in this first period;
   in a second period, the light guide module on the second side emits light and the light guide module on the third side is turned off, whereby when the first photo-detectors sense the object in this second period, the first photo-detectors receive light from a front side of the first photo-detectors but not a lateral side of first photo-detectors; and
   in a third period, the light guide module on the third side emits light and the light guide module on the second side is turned off, whereby when the second photo detectors sense the object in this third period, the second photo detectors only receive the light from their front side but not their lateral side.

15. The optical touch panel system of claim 14, wherein the image sensor is disposed on one end of the third side of the touch control area opposite the first side on which the reflective element is.

16. The optical touch panel system of claim 14, further comprising a plurality of light emitting units disposed on a segment of the second side of the touch control area opposite the first photo detectors.

17. The optical touch panel system of claim 14, wherein the light guide module includes a light guide bar and at least one light emitting device disposed at an end of the light guide bar.

18. The optical touch panel system of claim 14, wherein the first photo detectors are photo diodes or photo transistors.

19. The optical touch panel system of claim 14, wherein the reflective element is a retro-reflector.

20. The optical touch panel system of claim 14, wherein the image sensor and the first photo detectors alternatively receive light during different periods.

\* \* \* \* \*